(No Model.) 2 Sheets—Sheet 2.
J. C., R. J. & J. W. HANNAH.
POTATO DIGGER.
No. 569,787. Patented Oct. 20, 1896.
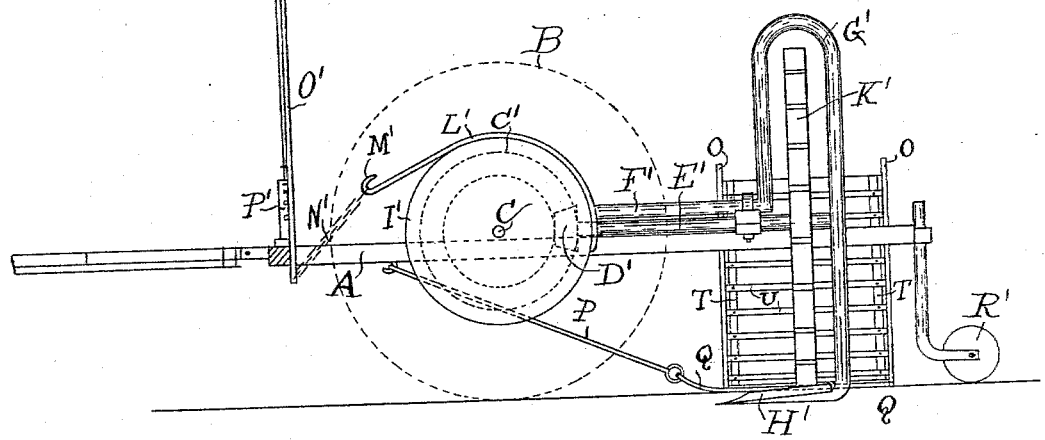
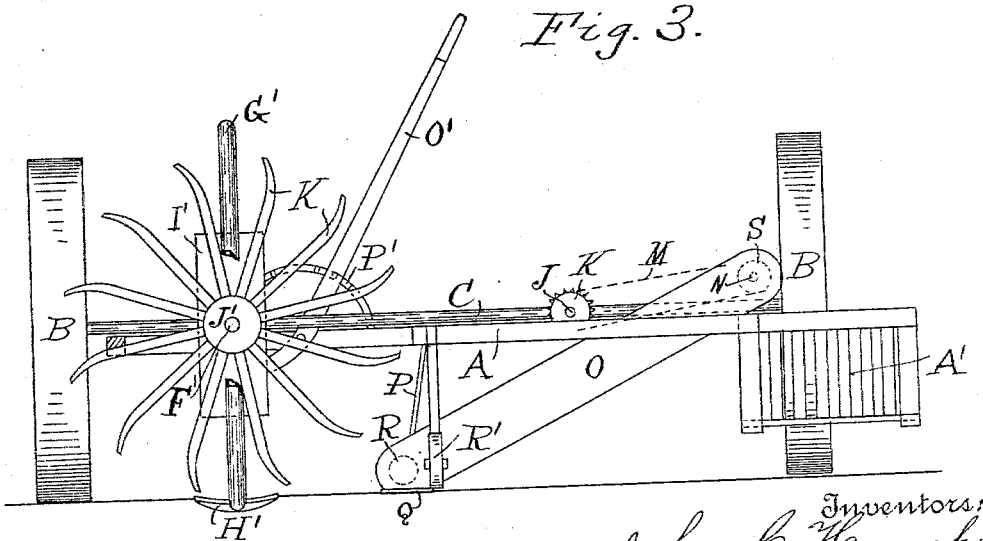
Witnesses
Molbry Haynes
Lillie B. Hodge
Inventors:
John C. Hannah,
Robert J. Hannah,
and Joseph W. Hannah.
By Joshua B. Webster Attorney

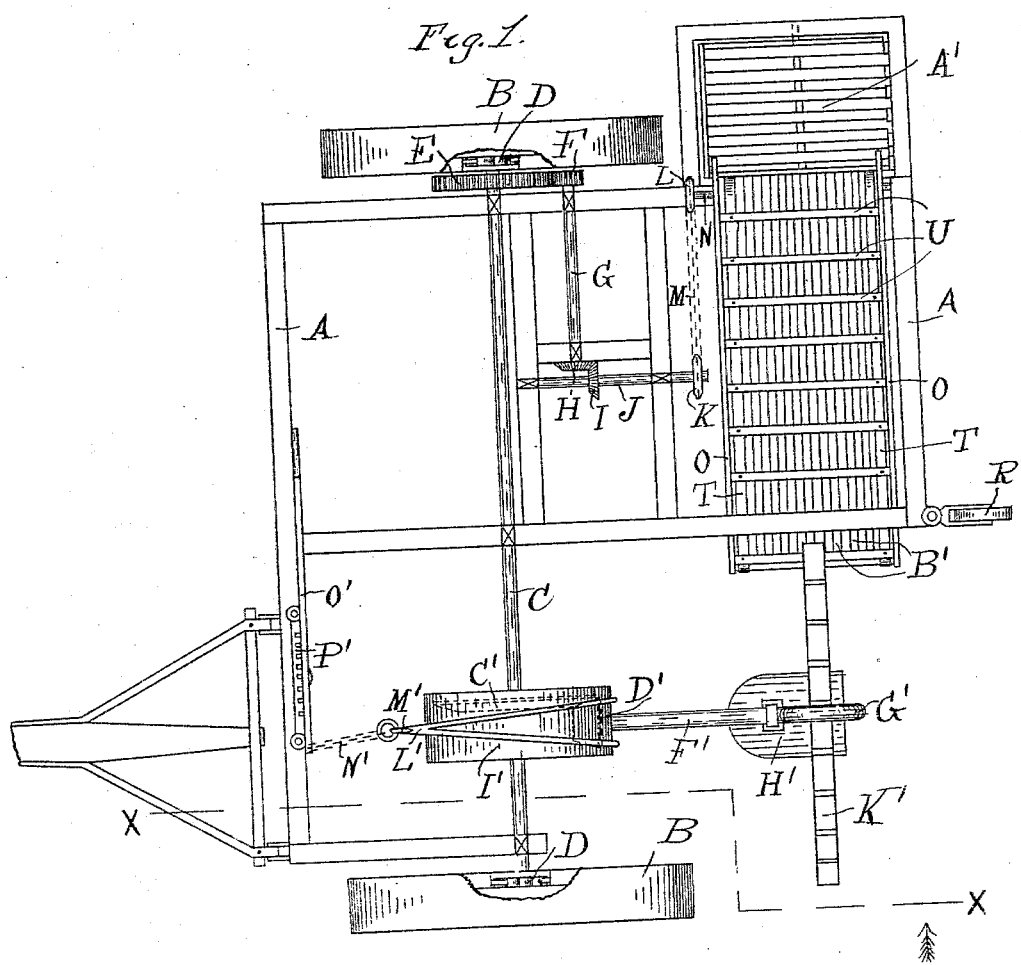

UNITED STATES PATENT OFFICE.

JOHN C. HANNAH, RUPERT J. HANNAH, AND JOSEPH W. HANNAH, OF STOCKTON, CALIFORNIA.

POTATO-DIGGER.

SPECIFICATION forming part of Letters Patent No. 569,787, dated October 20, 1896.

Application filed March 10, 1896. Serial No. 582,690. (No model.)

*To all whom it may concern:*

Be it known that we, JOHN C. HANNAH, RUPERT J. HANNAH, and JOSEPH W. HANNAH, citizens of Great Britain, residing at Stockton, in the county of San Joaquin and State of California, have invented certain new and useful Improvements in Potato-Diggers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to certain improvements in potato-diggers.

Our object is to provide a potato-digger which will effectually unearth potatoes expeditiously and gather and dump the same in piles; and it consists in the peculiar construction, novel combination, and adaptation of parts hereinafter described, and particularly pointed out in the claims hereunto annexed.

Referring to the accompanying drawings, Figure 1 is a plan view of our improved potato-digger. Fig. 2 is an elevation through line X X, Fig. 1. Fig. 3 is a rear elevation of the same.

Similar letters of reference indicate corresponding parts throughout the several views.

A represents the frame of our improved digger, which frame is mounted on two driving-wheels B, which are flexibly attached to the ends of a horizontal shaft C, which is journaled transversely on the frame A and is provided with pawl-and-ratchet mechanism D, such as is in common use, on either end for the purpose of allowing the free action of the wheels B while the digger is in the act of turning.

The right-hand end of the shaft C is provided with a gear-wheel E, which is rigidly attached thereto and adapted to engage with a pinion F, which is rigidly attached to the outer end of a transverse shaft G, which is suitably journaled on the frame A. H is a bevel gear-wheel which is rigidly attached to the inner end of the shaft G and is adapted to engage with a similar bevel gear-wheel I, which is rigidly attached to a horizontal longitudinal shaft J, which is suitably journaled on the frame A, such shaft J being provided with a sprocket-wheel K on the rear end of the same, which sprocket-wheel K engages with a similar sprocket-wheel L by means of a chain belt M.

The sprocket-wheel L is rigidly attached to one end of an elevator-shaft N, which is journaled in the upper ends of the sides of an elevator composed of the following parts: the sides or frame O of the elevator, which is suitably mounted with one end on the frame A and the other end on a shoe Q, which rests on the ground and is drawn by means of a rod P, which is attached at one of its ends to the front end of the shoe Q and at its other end to the under side of one of the bars of the frame A.

The lower end of the elevator is provided with a roller R and the upper end is provided with a drum S, which is rigidly attached to the shaft N. Such drum and roller are adapted to be engaged by an elevator composed of the belts T and slats U, which are adapted to elevate the potatoes introduced thereon and deposit the same in a receptacle A', which is attached to the side of the main frame A and adapted, as soon as the same is filled, to deposit the potatoes in a pile on the ground.

B' represents grate-bars, which are rigidly attached longitudinally beneath the slats U, between which the loose dirt falls.

A bevel gear-wheel C' is rigidly attached to and near the center of the shaft C, such bevel gear-wheel C' being adapted to engage with a bevel-pinion D', which is rigidly attached to the front end of a longitudinal shaft E', which is journaled beneath a horizontal bar F', which is formed into a gooseneck G', such gooseneck G' being provided with a digger H' at the bottom of the same.

The front end of the bar F' is rigidly attached to a casing I', which is journaled on the shaft C and adapted to inclose the bevel gear-wheels C' and D' for the purpose of excluding dust.

A wheel composed of a hub J' and spokes K' is rigidly attached to the rear end of the shaft E' and is adapted to rotate within the gooseneck G'.

L' represents a rod which is rigidly attached to the rear side of and adapted to pass over the top of the casing I', such rod being provided on its forward end with a hook M', which is adapted to engage with a chain N', which chain extends downwardly and engages with the lower end of a lever O', which is pivotally attached to the front of the frame A, such lever O' being provided with a semicircular guide P', which is also attached to the frame A.

R' represents a swivel-wheel which is pivotally attached to and near the center of the rear of the frame A for the purpose of maintaining the equilibrium of the same.

The outer ends of the spokes K' are slightly curved for the purpose of preventing the potatoes from being crushed upon the digger H' by such spokes K'.

The mode of operating our improved potato-digger is as follows: Suitable motive power being applied to impart motion to the digger, the digger H' is regulated by means of the lever O' and connecting chains, hooks, and rods, so as to pass beneath the hills of potatoes. Motion is communicated to the wheel J' K' by means of the wheels B, shaft C, bevel-gearing C' D', and shaft E', such wheel J' K' being adapted to rotate, thus throwing the potatoes from off the digger H' to the elevator T U B', which elevates them into the receptacle A'. The elevator is operated by means of the shaft C, drum S, and connecting wheels, shafts, and belts. While the machine is being transported from place to place the digger H' is raised out of the ground by means of the lever O'.

We are aware that potato-diggers have been made which elevate and deposit the potatoes in a receptacle, and these features we do not claim, broadly; but What we do claim as new, and desire to secure by Letters Patent, is—

1. In a potato-digger of the class described, the combination with a suitable frame and driving-wheels suitably mounted on a driving-shaft journaled on such frame, of the casing I' journaled on the driving-shaft, the bar F' rigidly attached to the rear of such casing I', the gooseneck G' attached to the bar F', the digger H' attached to the bottom of the gooseneck G', the bevel-gear C' rigidly attached to the driving-shaft within the casing I', the bevel-pinion D' rigidly mounted on the forward end of the shaft E' and adapted to engage with the bevel gear-wheel C', the shaft E' suitably journaled to and beneath the bar F', the wheel J', K' rigidly attached to the rear end of the shaft E', and suitable means for raising and lowering the digger all arranged and operating substantially as shown and described.

2. In a potato-digger of the class described the combination with the frame A, wheels B, and shaft C of the clutches D, the casing I', suitably journaled on the shaft C, the bar F' rigidly attached to the rear side of the casing I', the gooseneck G', rigidly attached to such bar F', the digger H' rigidly attached to the lower end of the gooseneck G', the bevel gear-wheel C' rigidly attached to the shaft C, the bevel-pinion D' rigidly attached to the forward end of the shaft E' and adapted to engage with the bevel gear-wheel C', the shaft E' suitably journaled beneath the bar F', the wheel J', K', rigidly mounted on the rear end of the shaft E', the rod L' attached to the casing I', the chain N' attached to the rod L', the lever O' pivotally attached to the frame A and adapted to engage with the chain N', the gear-wheel E attached to the shaft C, the pinion F rigidly attached to the outer end of the shaft G and adapted to engage with the gear-wheel E, the shaft G suitably journaled transversely on the frame A, the bevel gear-wheel H rigidly attached to the inner end of the shaft G, the bevel gear-wheel I suitably attached to the shaft J and adapted to engage with the bevel gear-wheel H, the shaft J suitably journaled longitudinally on the frame A, the sprocket-wheel K rigidly attached to the rear end of the shaft J, the chain belt M adapted to engage with the sprocket-wheels K and L, the sprocket-wheel L attached to the end of the shaft N, the shaft N journaled in the top end of the elevator O and provided with the drum S, the elevator O suitably mounted on the frame A and the shoe Q, the shoe Q attached to the frame A by the rod P, the roller R mounted in the lower end of the elevator O, the elevator T, U, adapted to engage with the roller R and drum S, and the receptacle A' attached to the side of the frame A all arranged and operating substantially as shown and described.

In testimony whereof we affix our signatures in presence of two witnesses.

JOHN C. HANNAH.
RUPERT J. HANNAH.
JOSEPH W. HANNAH.

Witnesses:
JOSHUA B. WEBSTER,
JAMES T. SUMMERVILLE.